MICROWAVE MIXER

Filed Oct. 6, 1954

INVENTORS
TORE N. ANDERSON
ROBERT M. HAUTZIK
ALBERT H. REEVES
BY Robert Henderson
ATTORNEY Fig. 5.
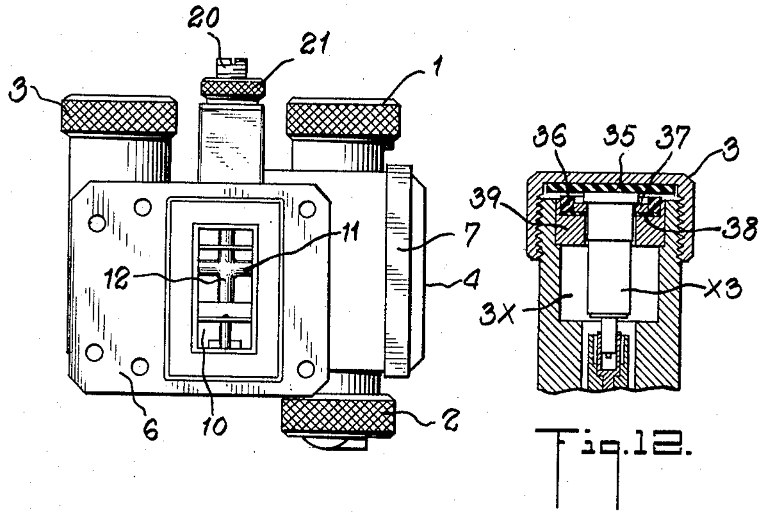
Fig. 12.
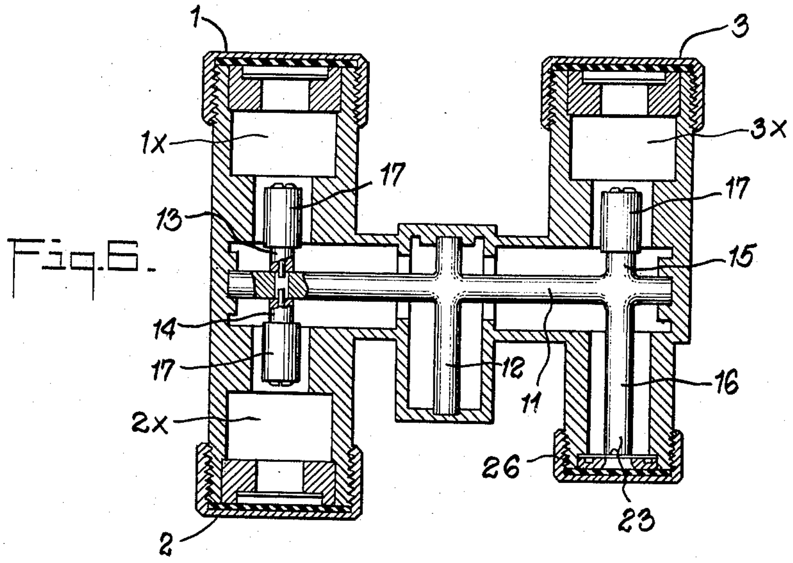
Fig. 6.
INVENTORS
TORE N. ANDERSON
ROBERT M. HAUTZIK
ALBERT H. REEVES
BY Robert Henderson
ATTORNEY

MICROWAVE MIXER

Filed Oct. 6, 1954 3 Sheets-Sheet 3 i-f

INVENTORS
TORE N. ANDERSON
ROBERT M. HAUTZIK
BY ALBERT H. REEVES

Robert Henderson
ATTORNEY 2,813,972
Patented Nov. 19, 1957

2,813,972

MICROWAVE MIXER

Tore N. Anderson, Mountainside, Robert M. Hautzik, Metuchen, and Albert H. Reeves, Elizabeth, N. J., assignors to Airtron, Inc., Linden, N. J., a corporation of New Jersey Application October 6, 1954, Serial No. 460,658
5 Claims. (Cl. 250—20)

This invention relates to a balanced mixer arrangement for microwave radio apparatus. It is particularly concerned with the development of improvements in coaxial and wave-guide hybrid junctions and with terminations which employ crystals to produce intermediate frequencies. These intermediate frequencies are derived from the mixing of two input signals, namely, a received radio wave and the output from a local oscillator of heterodyne frequency.

It is a primary object of our invention to provide a unified structure for mixing two microwave signals as above referred to, and also for accomplishing automatic frequency control of a local oscillator.

A second object is to arrange a hybrid mixer so as to divide the incoming signal energy and to drive two crystals equally and in phase, while causing the local oscillator energy to drive the same crystals in phase opposition, with the result that the noise components of the oscillator contribution are largely canceled.

A third object is to arrange our balanced mixer structure so as to provide excitation of one or more crystals for automatic frequency control, such crystals being hereinafter referred to as AFC crystals. In carrying out this object, we utilize one or more crystal mounts in a balanced mixer arrangement expressly for AFC purposes.

A fourth object is to provide an extremely compact balanced mixer arrangement having the three-fold function of (1) heterodyning a received radio signal in the microwave band with locally generated oscillations to produce an IF output, (2) obtaining noise suppression, and (3) controlling the frequency of the local oscillator automatically.

A fifth object is to provide improvements in a hybrid crystal mixer structure such as will effect a lowpass filter action in the termination of a coaxial line adjacent a crystal mount, and will thus substantially dispense with the need for a conventional RF choke in that region.

The foregoing and other objects and advantages of our invention will now be explained in detail, reference being had to the accompanying drawings in which:

Fig. 5 is an elevational view looking at the side on which there is a single wave-guide flange for mounting thereon a klystron oscillator;

Fig. 6 is a cross-sectional view taken on the vertical plane in which the line 6—6 of Fig. 1 lies;

Figure 10:
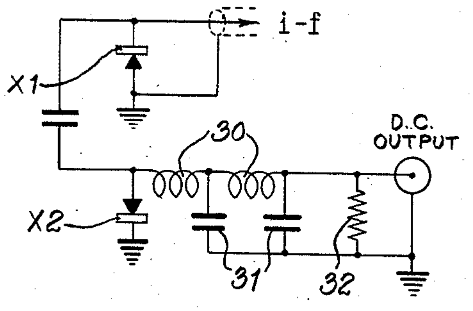
Fig. 10 is a circuit diagram of a low-pass filter arrangement having a D. C. output terminal leading to a utilization device which is to receive the intermediate frequency energy delivered by the hybrid mixer crystals.
Figure 11:
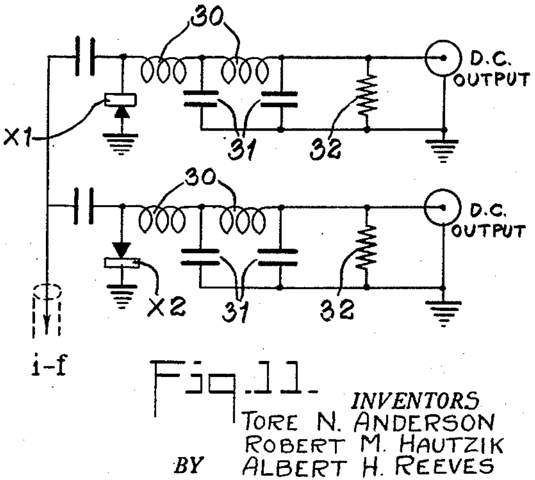

Fig. 11 is a circuit diagram having two low-pass filters, each similar to that of Fig. 10 and useful in a manner which will be hereinafter explained; and Fig. 12 shows a section taken in the same plane as that of Fig. 6 and showing a crystal mount suitably assembled within the housing of our mixer arrangement and arranged for excitation by energy delivered thereto at a coaxial termination, this termination being inclusive of a novel filter arrangement.

The main body of our improved mixer is preferably composed of a precision casting in which hollow wave-guide sections and coaxial-line sections are formed. Where center conductors are needed for the coaxial lines, these conductors of copper or brass are intended to be molded in situ. The casting itself is of a suitable aluminum or other alloy. Provision is made for mounting on it a plurality of crystal cartridges the function of which is to serve as components of a hybrid mixer and for automatic frequency control of the local oscillator.

Figure 1:
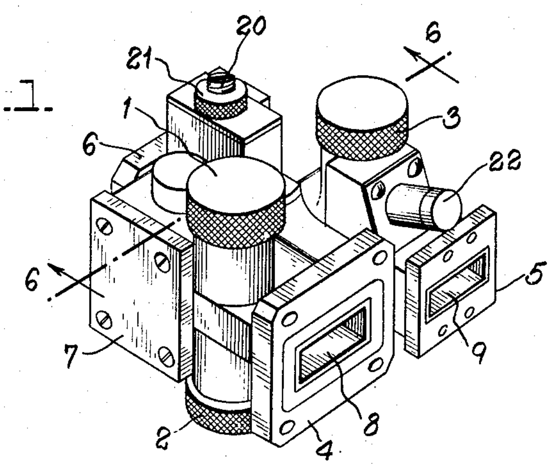
Figure 1 is a perspective view of a preferred embodiment of our improved balanced mixer arrangement.
Figures 2, 4:
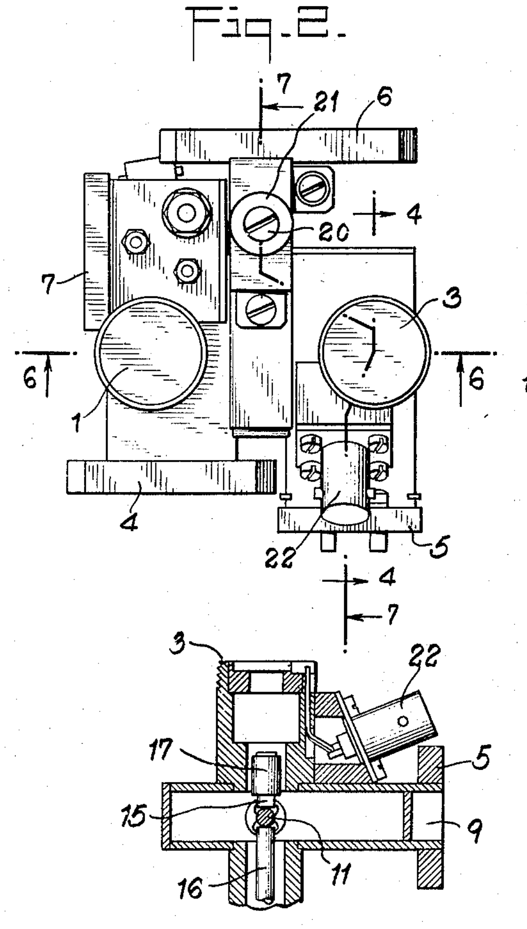
Fig. 2 shows a plan view of the same.
Fig. 4 is a fragmentary section taken along the line 4—4 of Fig. 2.
Figure 3:
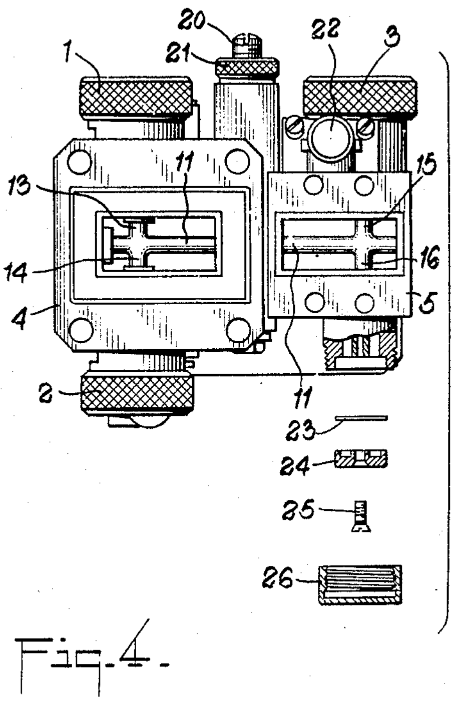
Fig. 3 is an elevational view, looking at the side of the mixer housing whereon there are two wave-guide flanges, the one on the left being used for basic heterodyning of the reecived radio frequency signal with locally generated oscillations, and the one on the right being used for sampling the outgoing radio signal to obtain a mixture for AFC purposes.

In several of the figures, but particularly in Fig. 1, we show caps 1, 2 and 3 for closing up spaces within which crystal cartridges are assembled. Different spaces 1*x*, 2*x* and 3*x* (Fig. 6) are provided for crystal cartridges or crystals X1, X2 and X3, respectively. The crystals X1 and X2 are mounted in a hybrid wave-guide junction, that is, at the extremities of two symmetrical arms thereof.

Energy from the local (klystron) oscillator is coupled into the hybrid via the broad wall T-junction having an opening 10 within the flange 6, as best shown in Fig. 5. A flange 4 surrounds the entrance 8 into which the signal energy of an incoming radio wave is admitted. A component of the outgoing radio signal energy is directed into the opening 9 which is surrounded by the flange 5, this component being used as a sample for AFC purposes, as will presently be explained.

A cover plate 7 (Figs. 1, 8 and 9) closes a compartment in the casting wherein the filter elements are held and are suitably shielded. These elements are mounted on the cover plate, interconnections between them, and to the cartridges, being made by means of conductors.

In the cross-sectional view of Fig. 6, we show a horizontal center conductor 11 for a coaxial line. This conductor extends coaxially with respect to the inner walls of the frame casting and thus complements a coaxial line. The ends of the conductor are embedded in the side walls of the casting. Prior to the formation of the core for the mold, conductor 11 is preferably assembled with other conductors 12 to 16, inclusive, which are constituted as vertical branches of the coaxial line. Branch 12 extends in front of, or in alignment with, the wave-guide opening 10 for reception of the klystron oscillator energy. Branch 13 extends toward the crystal X1. Branch 14 extends toward the crystal X2. Branch 15 extends toward the crystal X3. Branch 16 extends toward a termination device 23 which is constituted as a resistive disk and is a substitute for a second crystal in the automatic frequency control arrangement. All of these branches may be soldered or brazed to the center conductor 11 before forming the core of the mold about them.

In order to achieve suitable impedance matching and to maintain optimum VSWR characteristics, we mount transformers 17 on the ends of the coaxial branches 13, 14 and 15. These transformers face the respective crystals and suitably alter the wave energy as applied to the crystals for rectification.

The termination device which confronts the end of branch 16 of the coaxial line in the AFC section comprises a resistive disk 23, preferably silver-coated at the mounting surfaces, and a spacer member 24. The resistive surface of the disk 23 faces inwardly for impedance matching requirements. The spacer member 24 is so formed as to constitute a section of a shorted coaxial line, the length of which is suitably determined for canceling the energy reflected from the resistive disk.

Spacer or terminator member 24 is preferably assembled with conductor 16 by means of a screw 25 which enters a threaded hole in the end of conductor 16. A protective cap 26 is arranged to be screwed onto the cylindrical frame portion which surrounds conductor 16.

Figure 7:
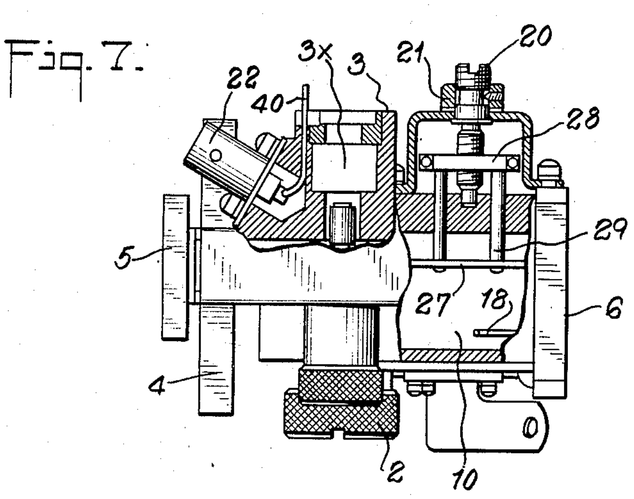
Fig. 7 is an elevational view, partly sectionalized approximately on the line 7—7 of Fig. 2, to show the construction of an adjustable attenuator arrangement in the wave guide which receives the energy generated by the klystron.

In the broken-out portion of Fig. 7, we show an attenuator structure within the wave guide opening 10 which is entered through the flange 6. The energy transmitted here is derived from the local klystron oscillator. The attenuator 27 is supported on two rods 29 which are spaced apart by substantially a quarter wave length of the generated oscillations. The rods 29 are affixed to a yoke 28, the latter being internally threaded so as to be adjustably mounted on a screw 20. This screw has a slotted head so as to be turned with a screw-driver. Optionally, also, it may be turned by means of a thumb-nut or knob 21, the latter being keyed to it.

The adjustbale positioning of the attenuator plate 27 is important, since it enables the absorption of a sufficient amount of energy to properly bias the crystals in the mixer. The attenuator plate 27 has a carbonized surface. It faces another fixed plate 18 with which it cooperates for purposes of attenuation.

A connector or bayonet-joint receptacle 22 is mounted in proximity to the flange 5 and serves as a holder for connecting thereto a shielded conductor (not shown) for output of the automatic frequency control energy.

Referring to Fig. 12, we show a detail of construction which is intimately associated with the terminations adjacent the crystal cartridges. It will be understood to be useful in any of the spaces 1*x*, 2*x* and 3*x*, and preferably all of them, although we have illustrated its use only with reference to the cartridge X3. Heretofore it has been the practice to provide some sort of a choke for purposes of attenuation of the energy to be detected by the crystals; primarily for attenuation purposes.

In place of the usual choke, which was not as discriminative as was desired, we have substituted a novel form of filter the characteristics of which are largely dependent on the dimensions of the parts utilized and the space factor of the receptacle 3*x* within which the crystal mount is situated. Our mixer apparatus was designed for fabrication with very close tolerances and reduced overall dimensions, so that it was difficult to fit the conventional choke construction into the space 3*x*.

The transformer 17 is bored axially to accommodate the insertion of the tip end of the crystal cartridge X3. These two elements fit together snugly in order to make a good electrical connection. We use a conventional crystal cartridge the components of which are well known. The head end and the tip end are spaced apart by a cylindrical insulator. Within this insulator are the crystal and the tungsten whisker. The flange of the head end is seated in a recessed portion of a metallic washer 37, this washer having a conductor soldered to it for output of the rectified energy. Washer 37 and a surrounding washer 36 of insulation material are assembled with another insulation washer 38, which is relatively thin, and with an outer metallic washer 39. The well 3*x* which contains this assembly is counterbored or molded so as to offer a shouldered seat for the washer 39.

The annular space between the washer 39 and the head end of the crystal mount X3 is of critical dimensions and is designed to obtain a low-pass filter effect. This effect is attributable to the capacitive relation between the cylindrical surface of the head end of the crystal mount and the bore of the washer 39, this washer being grounded by its seat within the body of the mixer housing. In contrast with the arrangement just now described, the heretofore-used choke was one which acted as a short-circuited coaxial termination, which we no longer need.

The attenuation of signal energy which is obtained by our capacitive filter, according to the embodiment which we built, was found to be substantially equivalent to that of the choke formerly used. The differences of construction leading to simplicity and reduction of the space factor will be apparent upon referring to the older construction as illustrated in a publication #16 of the Radiation Laboratory Series (M. I. T., Cambridge, Mass.), published by McGraw-Hill Book Co., Inc., 1948, and entitled, "Microwave Mixers." Page 126 of that book shows a sectional view of a conventional crystal mount assembled with a choke which is in the form of a short-circuited coaxial termination occupying a space somewhat removed from the body of the crystal amount. The advantages of our construction will be apparent.

Within the space that is closed by a cover plate 7 we mount the various components of one or another of the two alternative filter systems as shown in the diagrams of Figs. 10 and 11, respectively. Insulator posts are mounted on the cover for holding these components. Of these components there are chokes 30, capacitors 31 and a resistor (or two) 32 (Figs. 10 and 11). Suitable conductive connections (not shown) are extended from one of the chokes to a crystal cartridge, one of these connections being made through the aforementioned washer 37 (Fig. 12). The interconnections between filter components as mounted on the cover plate 7 are in accordance with one or the other of the diagrams shown in Figs. 10 and 11, respectively.

In the operation of our improved balanced mixer arrangement much of the underlying principles will be understood as being in accordance with what is explained in the above-cited book #16 of the Radiation Laboratory Series. Further than this, however, the following explanations may be found helpful for a full understanding of the nature of our improvements.

A fundamental feature of our invention is seen to involve the substitution of coaxial lines for hollow wave guides within the body of the mixer arrangement. This feature calls for the use of transitions, since the energy makes its entrance through the ports or flanges of wave guides and is collected on the cross-bars of the coaxial lines. Transmission of the energy to the hybrid mixers is accomplished by virtue of the space relation between the center conductors and the inner walls of the housing.

Considering first the mixing of the received signal with the output from the local heterodyning oscillator, the signal enters the port 8 within the flange 4 and is collected by the bars 13 and 14. The signal is then transmitted to the center conductors 13 and 14 and the conductive inner walls of the coaxial line formation. The T-junctions cause the energy of this signal to be split equally and in phase for application to the crystal detectors X1 and X2, the transmission being carried along the conductors 13 and 14. The transformers 17 which are attached to these conductors operate to transform the impedance of the coaxial line (conductors 13 and 14) to that of the crystal which terminates this line.

The local oscillator energy of heterodyne frequency enters the wave-guide opening 10 within the flange 6 and excites the transition means consisting of bars 11 and 12, these bars being coaxial with respect to inner walls of the mixer housing. This energy travels both ways along the cross-bar 11 and reaches the hybrid junctions at the two ends thereof. The local oscillator energy when it reaches the hybrid junctions is fed to the two crystals X1 and X2 in mutual phase opposition.

We preferably use crystals known in the trade as IN23C and IN23CR, the latter being a reverse polarity type. The direct crystal is herein referenced X1, and the reverse crystal is referenced X2. In the operation of the arrangement as shown, we achieve the distinct advantage that, upon mixing the received signal with the local oscillator energy, the noise components of the latter are canceled out while the rectification components of the received signal as derived from the two crystals are in phase agreement and, therefore, in aiding relation to each other.

Now, secondly, the operation of our mixer arrangement for automatic frequency control will be considered: The flange 5 has a wave-guide port 9 for admittance of a low-power sample of the outgoing signal energy, that is, in a radar system, a sample of the microwave which is transmitted for reflection by the target. This sample is likewise caused to excite the bars 15 and 16. It is then mixed with the energy of the local oscillator transmitted through the cross-bar 11. It was stated above that the local oscillator energy excites the conductors 11 and 12 and is transmitted in both directions along the cross-bar 11. Upon reaching the hybrid junction with coaxial conductors 15 and 16, the local oscillator energy component, as well as the admitted sample of the outgoing signal, is caused to be split and to travel in two opposing directions, one toward the space *3x* which contains a crystal cartridge X3, and the other portions of the split energies are conducted to the coaxial termination consisting of the disk 23 having a lossy characteristic, and the short-circuiting coaxial section 24. These two elements in combination are effective in absorbing the energy conducted to them and without reflecton, so that they act satisfactorily for balancing this AFC section of the balanced mixer unit. The simplified requirements for AFC make it possible to obtain electrical symmetry in this section without the need for two crystals. The termination device 23, 24 provides the necessary balance the same as though a second crystal were to be substituted.

The mixing of energies for AFC purposes, as described in the preceding paragraph, yields an intermediate frequency which can be used in a discriminator for controlling the frequency of the local oscillator. The circuit for performance of this AFC function is outside the scope of our invention and, therefore, is not shown. It will be understood, however, that the head end of the crystal cartridge X3 when seated on the conductive washer 37, as above described, provides a convenient means for delivering the rectified output of intermediate frequency energy through a conductor (not shown) and to the cable receptacle 22, and thence through a shielded conductor (not shown) leading to said discriminator. Utilization of the AFC energy is conventional. It is of the same intermediate frequency as is derived from the principal mixer section, but is isolated from the latter in order to prevent the AFC sample from being transmitted directly to the radio receiver circuit. The isolated AFC signal serves to control the repeller voltage applied to the klystron oscillator. This repeller voltage compensates for drift of the difference frequency and holds the frequency of oscillations generated by the klystron at a proper value.

Referring to Fig. 10, we show therein a filter circuit wherein there is an output terminal for delivery of the intermediate frequency signal (having a certain D. C. component) to the receiver. This terminal is labeled "i.-f." for identification. The filter has a low-pass characteristic the D. C. component of which is made available for purposes outside the scope of this invention, but possibly providing an indication of the amplitude of the local oscillator energy.

Figure 8:
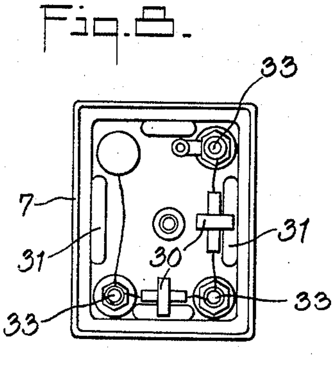
Fig. 8 is an inside view of a cover assembly on which certain filter elements are mounted, these elements being also included in the view.
Figure 9:
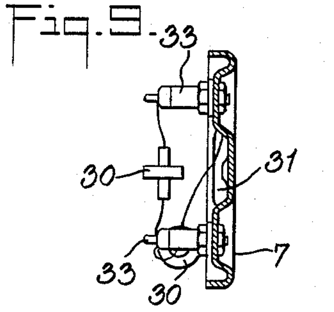
Fig. 9 is a cross section of the cover assembly.

Fig. 11 is of similar circuitry with respect to Fig. 10, but includes two filter arrangements and two D. C. output terminals. The following description reads fairly well on either Fig. 10 or on Fig. 11;

Each filter circuit comprises series inductances 30 and shunt capacitors 31. A load resistor 32 is connected between the high potential side of the filter and ground. The input end of each filter circuit receives the rectified energy from a respective one of the crystals X1, X2. The D. C. output in each case is represented as being carried off by means of a shielded conductor to any suitable means of utilization. The output terminal labeled "i-f" will be understood to carry the intermediate frequency signal to the main receiver. The filter system as shown in Fig. 10 and Fig. 11 may, either one, be mounted on insulator posts 33 such as are shown to be affixed to the inside of the cover plate 7 (Figs. 8 and 9).

In the foregoing description, it has been pointed out that within one single housing two separate and distinct balanced mixers are provided. One is for usual heterodyning of a received signal with the energy of a local oscillator, giving a useful intermediate frequency which is relatively free from noise components of the local oscillator. The other balanced mixer is for AFC purposes and although it uses the one cross-bar element 11 in common with the principal mixer, nevertheless, the functions of the two mixers are kept quite distinct and without mutual interference. Part of the isolation of the mixers is due to the fact that the incoming signal energy to be mixed with the local oscillations is delivered at moments which are interlaced with the sampled bursts of outgoing signal energy. So, the two mixing operations are separated in time. But even if they were concurrent, the two mixing operations would be completely independent. This is due to the fact that the energy admitted through the wave guide opening 9 cannot be propagated along the cross-bar 11.

It will be appreciated by those skilled in the art that the extreme compactness afforded by the arrangement of three coaxial hybrids having a common cross-bar 11 is both advantageous and novel, irrespective of any question as to whether or not the use of transitions between hollow wave guides and coaxial lines in the construction of hybrid mixers is broadly novel. We appreciate that in the above-cited book, and on page 269 thereof, mention was made of a magic-T circuit in which coaxial lines and wave-guide forms were combined. In what manner this was done, we do not know. Certainly, the description given in the book and the illustration (Figs. 6–11) do not in any way suggest the equivalent of the transitions used by us. Furthermore, there is no anticipation in that book of the common cross-bar arrangement for at least two hybrids, such as are comprehended within the single housing of the embodiment herein disclosed.

While we have described what is at present considered to be the preferred embodiment of our invention, it will be apparent to those skilled in the art that various changes and modifications may be made therein without departing from the spirit and scope of the invention.

We claim:

1. A microwave mixer comprising a unitary, conductive body having therein a straight, transverse, coaxial conducting portion which includes a straight cross-bar constituting an inner conductor rigidly supported coaxially within a cylindrical passage in said body; and three wave-guide ports in said body adapted for connection of wave guides thereto, the axes of said ports which extend through the latter being in alignment with and at right angles to said cross-bar, at spaced points along the latter; a first one of said ports being adapted for the conduction of heterodyning oscillations to said cross-bar, a second one of said ports being adapted for the conduction of a received radio signal to said cross-bar, and a third one of said ports being adapted for the conduction of a sample of a transmitted radio signal to said cross-bar; said mixer further including a pair of conductive branch bars, integral with said cross-bar and extending oppositely from and perpendicularly to the latter and perpendicularly to the said axis of the said second wave-guide port, said branch bars forming parts of inner coaxial conductors which extend coaxially within similar cylindrical passages in said body in conductive connection with crystal detectors.

2. A microwave mixer comprising a unitary, conductive body having therein a straight, transverse, coaxial conducting portion which includes a straight cross-bar constituting an inner conductor rigidly supported coaxially within a cylindrical passage in said body; and three wave-guide ports in said body adapted for connection of wave guides thereto, the axes of said ports which extend through the latter being in alignment with and at right angles to said cross-bar, at spaced points along the latter; a first one of said ports being adapted for the conduction of heterodyning oscillations to said cross-bar, a second one of said ports being adapted for the conduction of a received radio signal to said cross-bar, and a third one of said ports being adapted for the conduction of a sample of a transmitted radio signal to said cross-bar; said mixer further including a pair of conductive branch bars, integral with said cross-bar and extending oppositely from and perpendicularly to the latter and perpendicularly to the said axis of the said third wave-guide port, one of said branch bars forming a part of an inner coaxial conductor which extends coaxially within a cylindrical passage in said body in conductive connection with a crystal detector, and the other of said branch bars comprising an inner coaxial conductor which extends coaxially within a cylindrical passage in said body in conductive connection with a resistive impedance matching element.

3. A microwave mixer according to claim 2, further including a pair of conductive branch bars, integral with said cross-bar and extending oppositely from and perpendicularly to the latter and perpendicularly to the said axis of the said second wave-guide port, said branch bars forming parts of inner coaxial conductors which extend coaxially within similar cylindrical passages in said body in conductive connection with crystal detectors.

4. A microwave mixer according to claim 3, further including energy-attenuating means in said first wave-guide port and means, operative externally of the device, for adjusting said attenuating means.

5. A microwave mixer according to claim 3, said second and third ports being at one side of said cross-bar and said first port being at the opposite side of said cross-bar and in alignment with a portion of said cross-bar between points on the latter which are in alignment with said second and third ports.

References Cited in the file of this patent

UNITED STATES PATENTS

| | | |
|---|---|---|
| 2,550,409 | Fernsler | Apr. 24, 1951 |
| 2,563,591 | Edwards | Aug. 7, 1951 |
| 2,576,481 | Rodwin | Nov. 27, 1951 |
| 2,588,103 | Fox | Mar. 4, 1952 |
| 2,666,134 | Dicke | Jan. 12, 1954 |
| 2,709,240 | Gibson | May 24, 1955 |

OTHER REFERENCES

Microwave Transmission by Slater, McGraw-Hill, 1942, page 298.